(12) United States Patent
Bradford

(10) Patent No.: US 7,024,407 B2
(45) Date of Patent: Apr. 4, 2006

(54) WORD SENSE DISAMBIGUATION

(75) Inventor: Roger B. Bradford, Great Falls, VA (US)

(73) Assignee: Content Analyst Company, LLC, Reston, VA (US)

( * ) Notice: Subject to any disclaimer, the term of this patent is extended or adjusted under 35 U.S.C. 154(b) by 571 days.

(21) Appl. No.: 09/935,724

(22) Filed: Aug. 24, 2001

(65) Prior Publication Data

US 2002/0026456 A1  Feb. 28, 2002

Related U.S. Application Data

(60) Provisional application No. 60/227,301, filed on Aug. 24, 2000.

(51) Int. Cl.
*G06F 17/30* (2006.01)

(52) U.S. Cl. .............................................. 707/5; 707/3

(58) Field of Classification Search .................... 707/1, 707/2, 3, 4, 5, 101, 6; 704/9, 7, 10; 715/531, 715/532; 345/839, 866
See application file for complete search history.

(56) References Cited

U.S. PATENT DOCUMENTS

| | | | |
|---|---|---|---|
| 4,839,853 A | 6/1989 | Deerwester et al. | 707/5 |
| 5,278,980 A | 1/1994 | Pedersen et al. | 707/4 |
| 5,301,109 A | 4/1994 | Landauer et al. | 704/9 |
| 5,317,507 A * | 5/1994 | Gallant | 715/532 |
| 5,325,298 A | 6/1994 | Gallant | 704/9 |
| 5,619,709 A | 4/1997 | Caid et al. | 715/532 |
| 5,675,819 A | 10/1997 | Schuetze | 704/10 |
| 5,778,362 A | 7/1998 | Deerwester | 704/5 |
| 5,794,178 A | 8/1998 | Caid et al. | 704/9 |
| 5,873,056 A | 2/1999 | Liddy et al. | 704/9 |
| 6,269,368 B1 * | 7/2001 | Diamond | 707/6 |

OTHER PUBLICATIONS

Manning, CD., and Schutze, H., *Word Sense Disambiguation*, Foundations of Statistical Natural Language Processing, Chapter 7 (pp. 229-261), MIT Pres, 1999.

Cottrell, G.W., *Motivation And Introduction To The Problem*, A Connectionist Approach to Word Sense Disambiguation, 1989, p. 1, Morgan Kauffman Publishers, San Mateo, CA.

PCT International Search Report for related International Application No. PCT/US01/26397, International filing date Aug. 24, 2001, 4 pages.

(Continued)

*Primary Examiner*—Safet Metjahic
*Assistant Examiner*—Etienne P LeRoux
(74) *Attorney, Agent, or Firm*—Sterne Kessler Goldstein & Fox PLLC

(57) ABSTRACT

Systems and methods for word sense disambiguation, including discerning one or more senses or occurrences, distinguishing between senses or occurrences, and determining a meaning for a sense or occurrence of a subject term. In a collection of documents containing terms and a reference collection containing at least one meaning associated with a term, the method includes forming a vector space representation of terms and documents. In some embodiments, the vector space is a latent semantic index vector space. In some embodiments, occurrences are clustered to discern or distinguish a sense of a term. In preferred embodiments, meaning of a sense or occurrence is assigned based on either correlation with an external reference source, or proximity to a reference source that has been indexed into the space.

4 Claims, 5 Drawing Sheets

Implicit Location of Derived Word Senses

OTHER PUBLICATIONS

Kilgarriff, A. and Rosenzweig, J., *Senseval Scores*, 1998, University of Brighton, available at website: http://www.itri.brighton.ac.uk/events/senseval/ARCHIVE/RESULTS/senseval.html.

Kilgarriff, A., *SENSEVAL: An Exercise in Evaluating Word Sense Disambiguation Programs*, Granada, May 1998, available at website: http://www.itri.brighton.ac.uk/events/senseval/Granada.ps.

Kilgarriff, A., *What is Word Sense Disambiguation Good For?*, ITRI Report 97-08, University of Brighton, Dec. 1997, available at website: http://dfki.de/~paulb/ITRI-97-08.ps.gz.

Cheng, I., and Wilensky, R., *An Experiment in Enhancing Information Access by Natural Language Processing*, Univerisity of California, Berkeley, Report CSD-97-963, 1997, available at website:http://cs-tr.cs.cornell.edu:80/Dienst/UI/1.0/Display/ncstrl.ucb/CSD-97-963.

Resnik, P. and Yarowsky, D. *A Perspective on Word Sense Disambiguation Methods and Their Evaluation*, in Proceedings of SIGLEX '97, Washington, DC, 8 pages, 1997, available at website: http://www.cs.jhu.edu/~yarowsky/pubs/siglex97.ps.

Ng, Hwee Tou, *Getting Serious about Word Sense Disambiguation*, in Tagging Text with Lexical semantics: Why, What, and How?, workshop Apr. 4-5, 1997 Washington, D.C., available at website: http://www.ims.uni-stuttgart.de/~light/tueb_html/hweetou1.ps.

Deerwester, S., et al., *Indexing by Latent Semantic Analysis*, Journal of the American Society for Information Science, 41(6), 34 pages, Oct., 1990. Available at the website: http://lsi.agreenhouse.com/~remde/lsi/papers/JASIS90.pdf.

Dumais, S.T., *LSI Meets TREC: A Status Report*, In: D. Harman (Ed.), The First Text Retrieval Conference (TREC1), National Institute of Standards and Technology Special Publication 500-207, 1993. Available at website: http:lsi.agreenhouse.com/~remde/lsi/LSIpapers.html.

Dumais, S. T., Latent Semantic Indexing (LSI) and TREC-2. In: D. Harman (Ed.), the Second Text Retrieval Conference (TREC2), National Institute of Standards and Technology Special Publication 500-215, 1994. Available at website: http://lsi.argreenhouse.com/~remde/lsi/LSIpapers.html.

Dumais, S. T., *Latent Semantic Indexing (LSI): TREC-3 Report*, In: D. Harman (Ed.), The Third Text Retrieval Conference (TREC3), National Institute of Standards and Technology Special Publication, 1995. Available at website: http://lsi.argreenhouse.com/~remde/lsi/LSIpapers.html.

Dumais, S, et al, *Automatic Cross-Language Retrieval Using Latent Semantic Indexing*, in AAAI-97 Spring Symposium Series: Cross-Language Text and Speech Retrieval, Mar. 1997, Stanford University, Available at website: http://lsi.argreenhouse.com/~remde/lsi/papers/AAAI97.ps.

Ding, C., *A Similarity-based Probability Model for Latent Semantic Indexing*, Proceedings of the $22^{nd}$ Annual SIGIR Conference, Berkeley, CA, Aug. 1999.

Ide, N., and Veronis, J., *Introduction to the Special Issue on Word Sense Disambiguation: The State of the Art*, Special Issue on Word Sense Disambiguation, Computational Linguistics, vol. 24, #1, Mar. 1998, pp. 1-40.

Schutze, H., *Automatic Word Sense Discrimination, special Issue on Word Sense Disambiguation*, Computational Linguistics, vol. 24, #1, Mar. 1998, pp. 97-123.

International Preliminary Examination Report for Application No. PCT/US01/26397, dated Jul. 11, 2002 (mailing date).

* cited by examiner

|  | Doc #1 | Doc #2 | ... | Doc #n |
|---|---|---|---|---|
| able | 1 | 0 | ... | 1 |
| acid | 0 | 2 | ... | 0 |
| ... | ... | ... | ... | ... |
| \<term m\> | 1 | 0 | ... | 1 |

Term by Document Matrix

SVD Extracts Key
Relationships among Terms -
Basis for Conceptual Matching

Singular Value Decomposition (SVD) Operation

Dimensionality Reduction

2-D Representation of LSI Space

Grouping of Documents by Topic in LSI Space

**Location of the Word *Strike* in the LSI Space**

Distribution of Documents that Contain the Word *Strike*

Clustering of Occurrences of the Word *Strike*

Implicit Location of Derived Word Senses

WORD SENSE DISAMBIGUATION

CROSS-REFERENCE TO RELATED APPLICATIONS

This application claims benefit of, and hereby incorporates in its entirety, U.S. Provisional Application No. 60/227,301, filed Aug. 24, 2000.

FIELD OF THE INVENTION

The present invention relates to the field of processing machine-readable documents, and in particular to a method and system for word sense disambiguation.

BACKGROUND OF THE DISCLOSURE

One of the most challenging problems in information technology today is improving the methods through which people interact with computer systems. This problem is made difficult because, among other reasons, humans typically rely overwhelmingly on natural language, e.g., English, for transfer of information. Although people deal with natural language with relative ease, processing of natural language using computer systems has turned out to be an exceedingly difficult problem. One source of this difficulty is the ambiguous meaning of many natural language terms.

There are several sources of ambiguity in language; however, the most pervasive is ambiguity in term meaning. This is referred to as polysemy. In general, all human languages exhibit a high degree of polysemy.

In English, most frequently used terms have several common meanings. For example, the word fire can mean: a combustion activity; to terminate employment; to launch; or to excite (as in fire up). For the 200 most-polysemous terms in English, the typical verb has more than 12 common meanings, or senses. The typical noun from this set has more than eight common senses. For the 2000 most-polysemous terms in English, the typical verb has more than eight common senses and the typical noun has more than five.

Polysemy presents a major obstacle for all computer systems that attempt to deal with human language. This is true for both written and spoken language. In order to achieve commercially acceptable performance, some means must be found to reliably discern the presence of a word sense, reliably distinguish between different senses of the same term, and reliably determine the correct sense for the terms that are encountered. Such discerning, distinguishing, or determining of the sense of terms in written or spoken language is referred to, generally, as word sense disambiguation (WSD).

The effects of polysemy in computer processing of language are ubiquitous. The March 1998 issue of the journal *Computational Linguistics* is a special issue on word sense disambiguation. In their introduction to the issue, Ide and Veronis state: "Sense disambiguation . . . is necessary at one level or another to accomplish most natural language processing tasks. It is obviously essential for language understanding applications, such as man-machine communication; it is at least helpful, and in some instances required, for applications whose aim is not language understanding." Ide, N., and Veronis, J., Introduction to the Special Issue on Word Sense Disambiguation: the State of the Art, Special Issue on Word Sense Disambiguation, *Computational Linguistics*, Volume 24, #1, March, 1998, pp 1–40.

The importance of word sense disambiguation can be seen in the case of machine translation systems. An incorrect choice of sense for even a single term can change the meaning of a passage. Such misinterpretation can yield incorrect results. A well-known example is the (perhaps apocryphal) instance of a machine translation system that reportedly mistranslated hydraulic rams as water goats. Although there are other sources of ambiguity, polysemy presents a major problem in machine translation today.

Polysemy also is a critical problem in the area of information retrieval. For example, a query to a database on the word strike in order to find information on labor disputes would also be inundated with information on the following:
  sports (strikes in bowling and baseball);
  military actions (air strikes, etc.);
  objects that strike one another;
  striking of matches and oil;
  cases where people strike up a conversation;
  events that strike people as funny; and
  a range of other topics in which this particularly polysemous term occurs.

Polysemy creates difficulties in all aspects of text filtering and retrieval, including query interpretation, categorization, summarization, result matching, and ranking.

Polysemy limits the performance of systems in other application areas, including but not limited to:
  speech recognition;
  text-to-speech conversion;
  content and thematic analysis;
  grammatical analysis;
  text categorization;
  text summarization; and
  natural language understanding.

In each of these applications, differentiating among multiple word senses is a key to improving performance. In some applications, it is sufficient to be able to identify which occurrences of a given term have the same sense. That is, it is sufficient to be able to associate each occurrence of a given term with the collection of occurrences of that term that has the same sense. This is referred to as sense discrimination. In other applications, each such collection is labeled with the specific meaning of the term that corresponds to that cluster. This is referred to as sense tagging. The present invention addresses each of these objectives.

The importance of word sense disambiguation was noted in one of the first papers ever published on computer processing of language. Weaver, W., translation, mimeographed, 12 pp., Jul. 15, 1949. Reprinted in Locke, W, and Booth, A. D., (Eds.), Machine Translation of Languages, John Wiley & Sons, New York, 1955, pp. 15–23. Since that time, authorities in the area of natural language understanding and related fields have consistently cited both the importance of the topic and the significant limitations of available techniques. In the published version of his doctoral dissertation (1989), Cottrell noted: "Lexical ambiguity . . . is perhaps the most important problem facing an NLU (Natural Language Understanding) system." Cotrell, G. W., A Connectionist Approach to Word Sense Disambiguation, Morgan Kaufman Publishers, 1989. In their 1997 SIGLEX presentation, Resnik and Yarowsky declared: "Word sense disambiguation is perhaps the great open problem at the lexical level of natural language processing." Resnick, P., and Yarowski, D., A Perspective on Word Sense Disambiguation Methods and their Evaluation, in: Proceedings of SIGLEX '97, Washington, D.C., 1997, pp. 79–86. In his 1997 paper, Hwee similarly noted: "WSD is a challenging task and much improvement is still needed." Hwee, T. N., Getting Serious about Word Sense Disambiguation, in: Tagging Text with Lexical Semantics: Why, What, and How?, workshop, Apr. 4–5, 1997, Washington, D.C. In their introduction to the March, 1998 special issue of the journal *Computational Linguistics* devoted to the topic of word sense disambiguation, Ide and Veronis state: "the problem of word sense disambiguation has taken center stage, and it is frequently cited as one of the most important problems in natural language processing research today". In the summary to their introduction, they state: "in the broad sense, relatively little progress seems to have been made in nearly 50 years". In the conclusion to a chapter on word sense disambiguation in their landmark 1999 book on natural language processing, Manning and Schutze note: "Much research remains to be done on word sense disambiguation". Manning, C., and Schutze, H., Foundations of Statistical Natural Language Processing, MIT Press, 1999.

Some approaches to word sense disambiguation rely upon the existence of dictionaries or thesauri that contain the terms to be disambiguated. In these methods, the sense of a given term is estimated based upon the terms in a window surrounding the given term. The sense, or meaning, is chosen based upon the correlation of these surrounding terms with the terms that happen to be used in the various dictionary definitions or thesaurus entries. The accuracy of these approaches has been poor, in the 50% to 70% range, even for terms with small numbers of distinctly differentiated senses. Accuracy can be improved in those specific cases where a term to be disambiguated appears more than once in a text segment of interest. This is done through employing an assumption that all such occurrences correspond to the same sense of that term (the "one sense per discourse" assumption.) The applicability of this condition is limited, however, by the fact that term occurrences follow a hyperbolic distribution (Zipf's Law). That is, on average, more than half of all terms that appear in a given passage of text of reasonable length will occur only once in that passage.

These approaches to disambiguation are fundamentally limited by the vocabulary coverage of the dictionaries and thesauri employed. The approaches exhibit significantly degraded performance in domains that employ specialized terminology. The static nature of the dictionaries and thesauri used also make them inherently unsuited for dealing with changes in language over time.

Approaches have been proposed for automatic (statistical) extension of thesauri. Thesaurus-based techniques, however, fundamentally are unable to deal with word senses that are not strongly correlated with the specific categories used in the thesaurus.

Other approaches to word sense disambiguation exploit the fact that multiple senses of a term in a given language may translate as distinct terms in another language. These approaches require a large, carefully translated parallel corpus together with a bilingual dictionary for the language pair in question. Generation of such corpora is resource-intensive and is inherently constrained in terms of domain. For a given term to be disambiguated, the technique requires that the specific phrase in which that term occurs also be present in the parallel corpora. Thus, either very large corpora are required or many term occurrences will not be amenable to disambiguation. In addition, there is rarely a perfect one-to-one mapping between word sense in one language and distinct terms in another language. Thus, there are many senses that cannot be disambiguated even if the exact phrase is found. Other senses will yield only the most probable sense among many. Often these probabilities will be less than 50%.

Prior statistical approaches to word sense disambiguation typically have required the existence of a training set in which the terms of interest are labeled as to sense. The cost of creating such training sets has severely limited the application of these approaches. Such approaches are very limited in domain and are not well suited for dealing with the changes in language over time. In addition, these approaches invariably employ a fixed context window (typically plus or minus a few terms), which significantly compromises performance. Some approaches to statistical disambiguation have employed unsupervised techniques. The advantage of this approach is that the training set does not need to be labeled as to sense. These approaches are only applicable to sense discrimination. The effectiveness of the technique is highly dependent upon the correlation between the terms and their usage in the training set and the term distribution and usage in the text to be disambiguated. The technique also is weak for infrequently used senses and senses that have few distinctive collocated terms. Performance of these approaches has been reported as 5% to 10% lower than that of dictionary-based approaches.

One class of approaches to word sense disambiguation relies on the parsing of sentences. Accurate parsing for this purpose depends upon the prior existence of a world model. These approaches suffer from two drawbacks: first, they require a high degree of manual effort in constructing the necessary world models; and second, tractable world models are inherently limited in the extent of the domain that they can cover.

Other approaches to WSD rely on analysis of sentences based on sets of processing rules. In order to obtain even modest accuracy these collections of rules become elaborate, involving templates such as Agent-Action-Object triples. An Agent-Action-Object triple is a set of three terms that can stand in the relationship of an agent that carries out the specified action on the specified object. Once again, these approaches require large amounts of initial manual work and are inherently limited in the scope of their applicability. Some such systems attempt to achieve reasonable coverage and accuracy through use of word experts—handcrafted rule-based expert systems for each term to be encountered. Information is exchanged among these word experts on an iterative basis until a plausible estimate of sentence meaning is generated. The complexity of such systems is indicative of the lengths to which people have been willing to go in order to obtain useful levels of word sense disambiguation. The individual word experts in such systems can constitute pages of code. Even with such elaboration, however, the rapidly increasing combinatorics significantly limits the extent of the context that can be taken into account.

Connectionist approaches to word sense disambiguation suffer many of the same drawbacks as the rule-based approaches. Such approached typically require a large amount of manual effort required in establishing the networks. As the extent of the context that is taken into account is increased, the complexity of the networks grows rapidly. Thus, both domain of applicability and extent of context are constrained.

A large-scale evaluation of existing word sense disambiguation systems has been conducted under the auspices of ACL-SIGLEX, EURALEX, ELSNET, and the EU projects ECRAN and SPARKLE. This project entailed testing of 19 different approaches to the problem. University of Brighton (England), Information Technology Research Institute. *SENSEVAL*, Evaluating Word Sense Disambiguation Systems [online]. 2001 [retrieved on 2001-08-10]. Retrieved from the Internet: <URL: http://www.itri.bton.ac.uk/events/senseval/>.

SUMMARY OF THE INVENTION

Preferred embodiments of the present invention include systems and methods for word sense disambiguation, including discerning one or more senses or occurrences of a term, distinguishing between senses or occurrences, and determining a meaning for a sense or occurrence of a subject term. In a collection of documents containing terms and a reference collection containing at least one meaning associated with a term, the method includes forming a vector space representation of terms and documents. In preferred embodiments, the vector space is a latent semantic index vector space. In some embodiments, occurrences are clustered to discern or distinguish a sense of a term. In preferred embodiments, meaning of a sense or occurrence is assigned based on either correlation with an external reference source, or proximity to a reference source that has been indexed into the space.

BRIEF DESCRIPTION OF THE FIGURES

Preferred embodiments of the present invention are shown by way of example and not limitation in the accompanying drawings

DETAILED DESCRIPTION OF PREFERRED EMBODIMENTS OF THE INVENTION

Figures 1, 2:
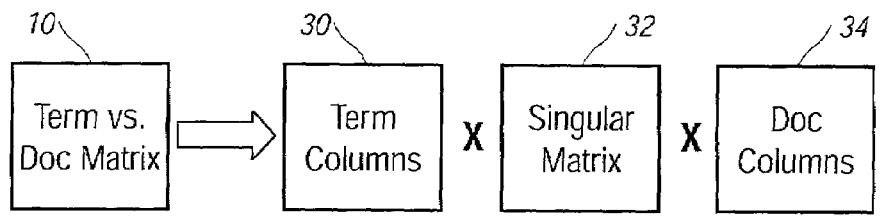
FIG. 1 illustrates formation of the term by document matrix used in preferred embodiments of the present invention.
FIG. 2 illustrates decomposition of the term by document matrix of the present invention into three constituent matrices.

The intended sense or meaning for a term is best determined considering the context in which it is appears. Preferred embodiments of the present invention make essential use of a vector space representation of the text passages, i.e. textual context, in which the terms to be disambiguated appear.

In the generation of the vector space, the following pre-processing steps may be applied to the text:

removal of frequently-occurring words such as the, and, and of, that have little contextual discrimination value, i.e., stop words;

treating certain combinations of terms (e.g., United States) as a phrase;

splitting of hyphenated terms;

word stemming, i.e., reducing words to a root form (e.g., clears, cleared, clearing all being reduced to the stem clear).

The extent to which any or all of the above pre-processing steps are applied will depend on the application.

Although other vector space representations could be used for this purpose, the technique of Latent Semantic Indexing (LSI) provides a vector space that is provably optimal in key respects. The LSI technique (including singular value decomposition and dimensionality reduction as described herein) provides a method for extracting semantic information that is latent in a collection of text that is susceptible to a high degree of automation. This technique can create a full index, i.e., an LSI vector space, of a collection of documents without significant human intervention. The basic technique is described in an article by Deerwester and in U.S. Pat. No. 4,839,853 (the '853 patent). Deerwester, S., et al., Indexing by Latent Semantic Analysis, Journal of the American Society for Information Science, 41(6), pp. 391–407, October, 1990. The optimality of this technique is shown in Ding, C., A Similarity-based Probability Model for Latent Semantic Indexing, Proceedings of the 22nd Annual SIGIR Conference, Berkeley, Calif., August, 1999. The LSI technique has been shown to be of considerable value as an approach to text retrieval.

The LSI technique starts with a collection of text passages, typically referred to in the literature as documents. The term document in this case may refer to paragraphs, pages, or other subdivisions of text and not necessarily to documents in the usual sense, i.e., externally defined logical subdivisions of text. For simplicity, this disclosure follows the standard convention of referring to the text passages of interest as documents. The disclosure uses term and word interchangeably as elements of documents.

The use of LSI is illustrated with reference to FIG. 1. As a first step, a large sparse matrix 10 (the T×D matrix of dimension m×n, where m is equal to the number of unique terms considered and n equals the number of documents considered) formed. Each row, e.g. 12, in the T×D matrix 10 corresponds to a term that appears in the documents of interest, and each column, e.g., 14, corresponds to a document. Each element (i, j), e.g., 16 in the matrix corresponds to the number of times that the term corresponding to row i occurs in the document corresponding to column j. For example, in FIG. 1, able appears one time in Doc #1 and acid appears two times in Doc #2.

Figure 3:
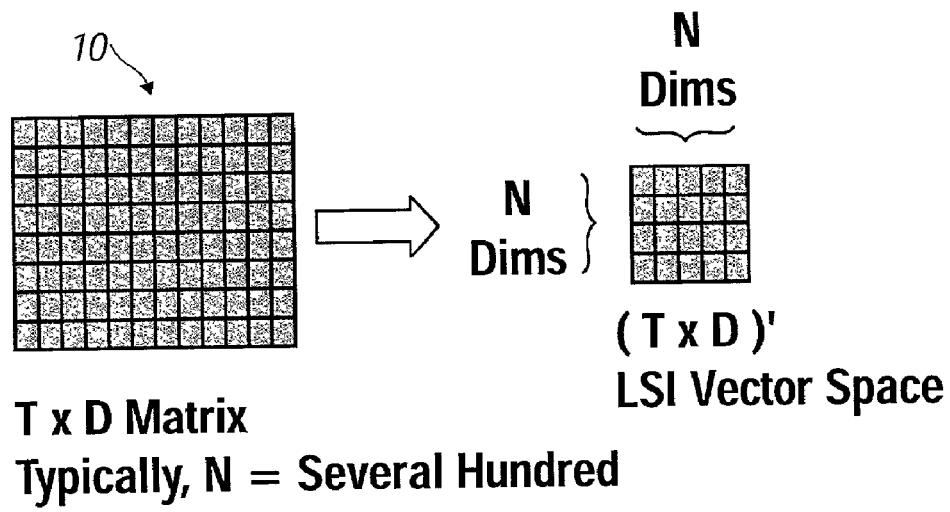
FIG. 3 illustrates formation of the LSI matrix used in preferred embodiments of the present invention.

Referring to FIG. 2, the known technique of singular value decomposition (SVD) can be used to decompose the T×D matrix to a product of three matrices 30, 32, 34, including a matrix 32 that has non-zero values only on the diagonal. Small values on this diagonal, and their corresponding rows and columns in the other two matrices 30, 34 are then deleted. This truncation process is used to generate a vector space of reduced dimensionality as illustrated in FIG. 3 by recombining the three truncated matrices into (T×D)' matrix. The relationship between the position of terms and documents in this new vector space are subject to the same properties as in the original vector space.

In order to explain the operation of the present invention, it is useful to keep in mind the following properties of the vector space:

Every document is located at the geometric average of the terms that the document contains.

Every term is located at the geometric average of the documents that contain the term.

Preferred embodiments of the present invention make use of the properties of the resultant vector space defined by the (T×D)' matrix to determine the probable context within which terms are used in documents of interest. It should be noted that the use of the specific vector space generated using the LSI technique is not absolutely essential. In an alternate embodiment, a person skilled in the art could make use of slightly different vector space representations of the documents. However, it has been demonstrated that the LSI space, as characterized by the (T×D)' matrix, is an optimal semantic subspace based on maximum likelihood estimation.

Figure 4:
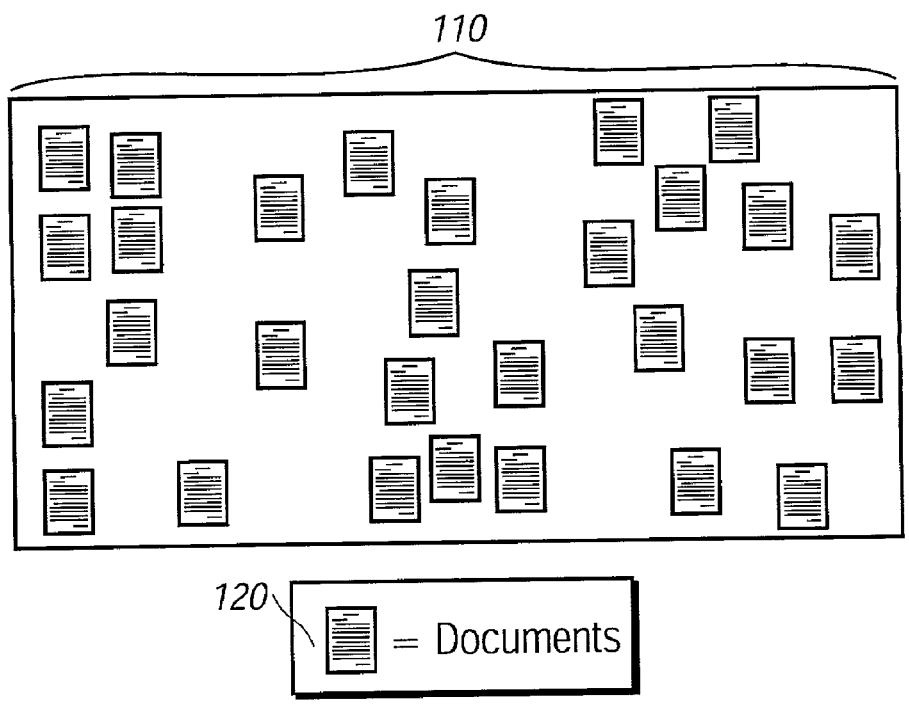
FIG. 4 illustrates a two-dimensional representation of an LSI space according to one embodiment of the present invention.

The present invention exploits the properties of the LSI vector space in order to determine the probable context of terms and to disambiguate them. As an example, consider an LSI space in which a collection of English-language documents covering a broad range of topics has been indexed. Such a space typically would have several hundred dimensions. FIG. 4 is an illustration of such an LSI space 110 in a greatly simplified manner, i.e., within the limitations of a two-dimensional figure. The documents 120 of the collection are distributed throughout the space 110, depending upon the collection of terms that they contain.

Figure 5:
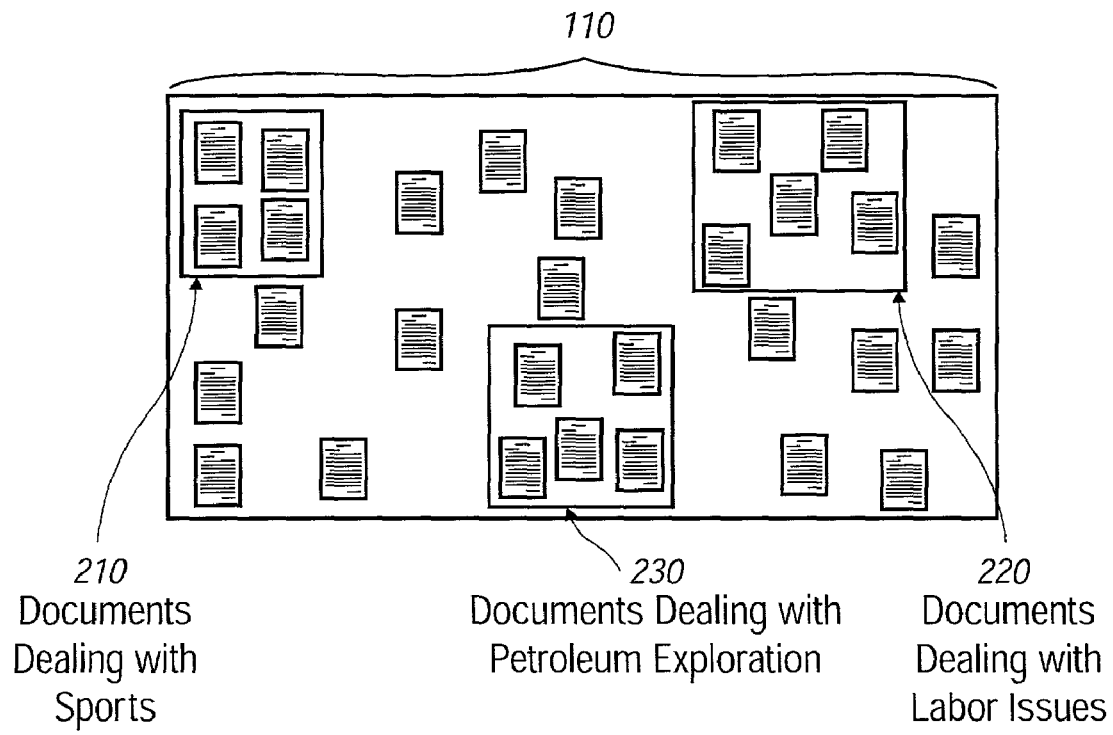
FIG. 5 illustrates a two-dimensional representation illustrating grouping of documents by topic within an LSI space according to one embodiment of the present invention.

Documents 120 that treat similar subject matter cluster together in the space 110 due to correlations among the terms contained in the documents 120. In FIG. 5, three such clusters 210, 220, 230 are shown for strike for illustration:

Documents that primarily deal with sports 210

Documents that primarily deal with labor issues 220

Documents that primarily deal with petroleum exploration 230

As part of the example, consider the distribution of the occurrences of strike. Strike is a particularly polysemous word. In this example, consider only three of its many meanings:

to swing at and miss, as in baseball, to refuse to work, and to locate a new oil deposit.

Figure 6:
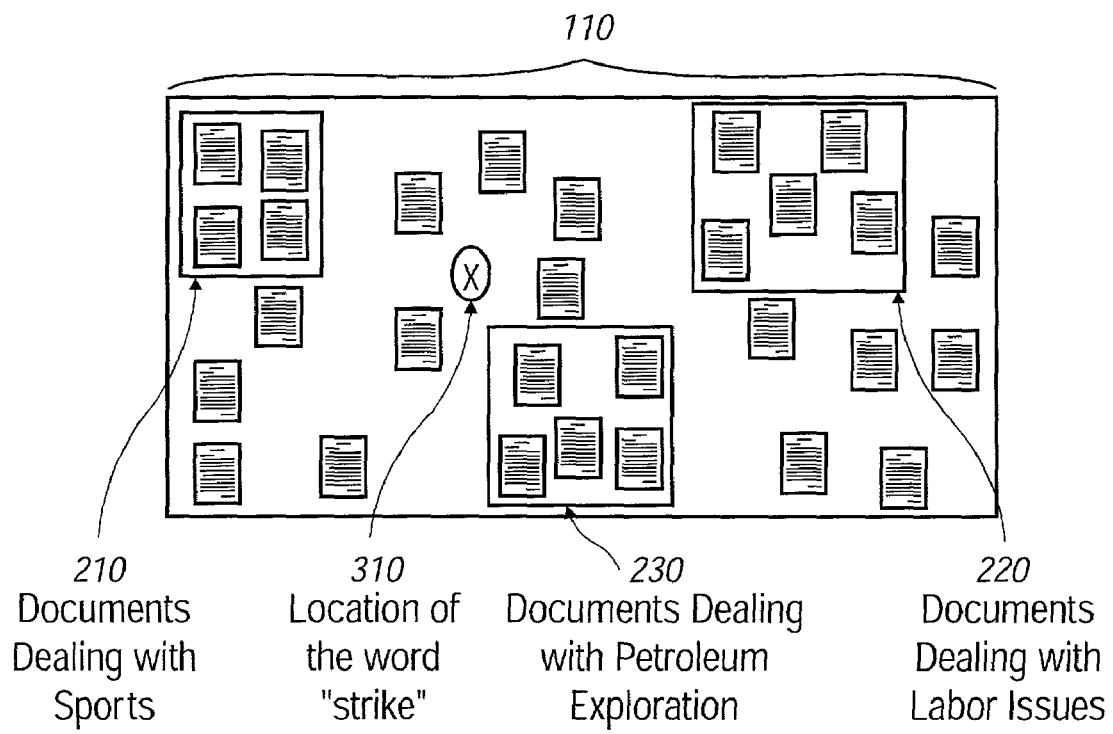
FIG. 6 illustrates a two-dimensional representation illustrating the location of the term strike in an LSI space according to one embodiment of the present invention.

As indicated in FIG. 6, strike has a location 310 in the LSI space 110 that is the vector sum of the locations of all of the documents that contain this word. For a polysemous word such as strike, this position is determined by the location of documents that contain all of the meanings of the word.

Figure 7:
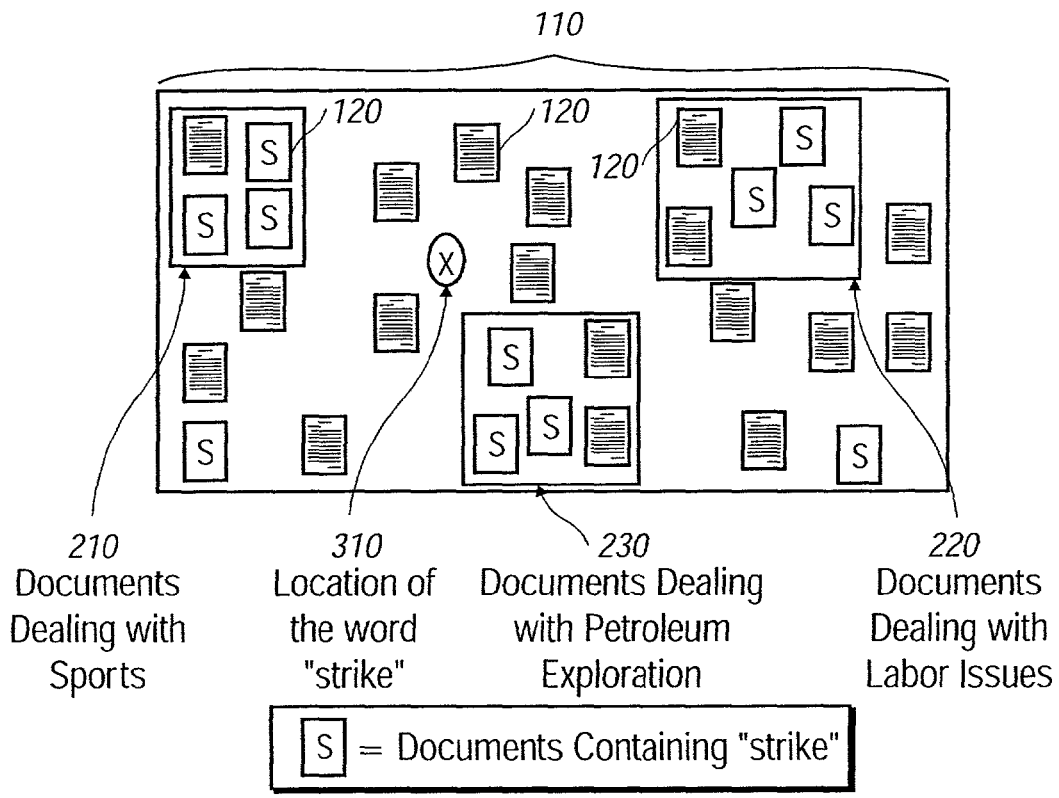
FIG. 7 illustrates a two-dimensional representation illustrating the distribution of documents containing strike within an LSI space according to an embodiment of the present invention.

The distribution of strike among the documents 120 in the space 110 is represented in FIG. 7. The occurrences of individual senses of strike are strongly correlated with the subject matter of the documents:

In the region of the LSI space 110 where documents dealing with sports 210 tend to cluster, the sense of strike primarily is that of swinging at a ball and missing.

In the region of the space 110 where documents dealing with labor issues 220 tend to cluster, the sense of strike is overwhelmingly that of a work stoppage.

In the region of the space 110 where documents dealing with petroleum exploration 230 tend to cluster, the sense of strike primarily is that of striking oil.

The various senses of strike thus are highly differentiated in the LSI space 110. This is true for most all terms with more than one topic-related sense.

Figure 8:
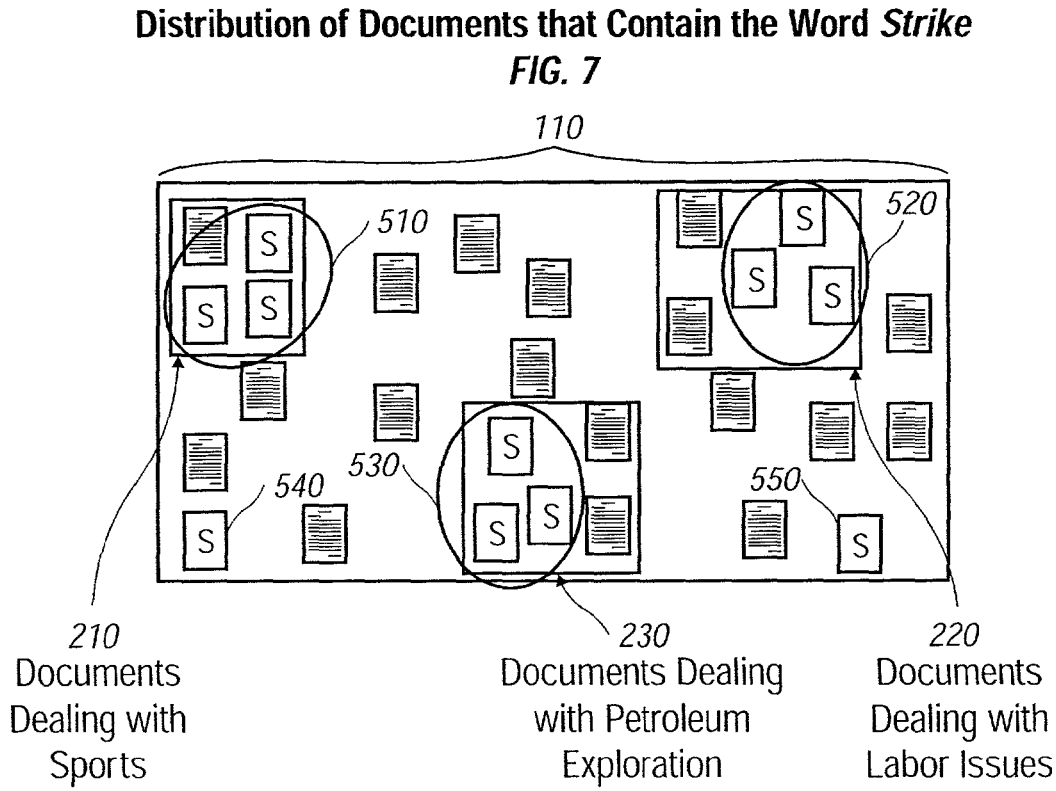
FIG. 8 illustrates a two-dimensional representation of an LSI space illustrating clustering of occurrences of strike according to one embodiment of the present invention.

Preferred embodiment of the present invention now apply standard clustering techniques to discern/discriminate the one or more senses of such terms. A reference on clustering techniques is: Mathematical Classification and Clustering, Nonconvex Optimization and Its Applications, Vol. 11 by Boris Mirkin. FIG. 8 shows the results of applying clustering techniques to the locations of documents that contain the word strike. Three regions of concentration 510 (sports), 520 (labor issues), 530 (petroleum exploration) are found, as well as two isolated instances 540, 550. To a first approximation, the tightness of clustering of the groupings gives us an indication of the likelihood that the clustering reflects actual differences in word sense. The specific clustering technique that would be used to determine the tightness of the clustering would depend, in part, on the application. Most of the standard techniques for clustering involve a parameter that can be measured and that reflects the distinctness of each cluster. In the present example, applying a clustering threshold results in disambiguation of three principal senses of strike in the documents of interest.

Figure 9:
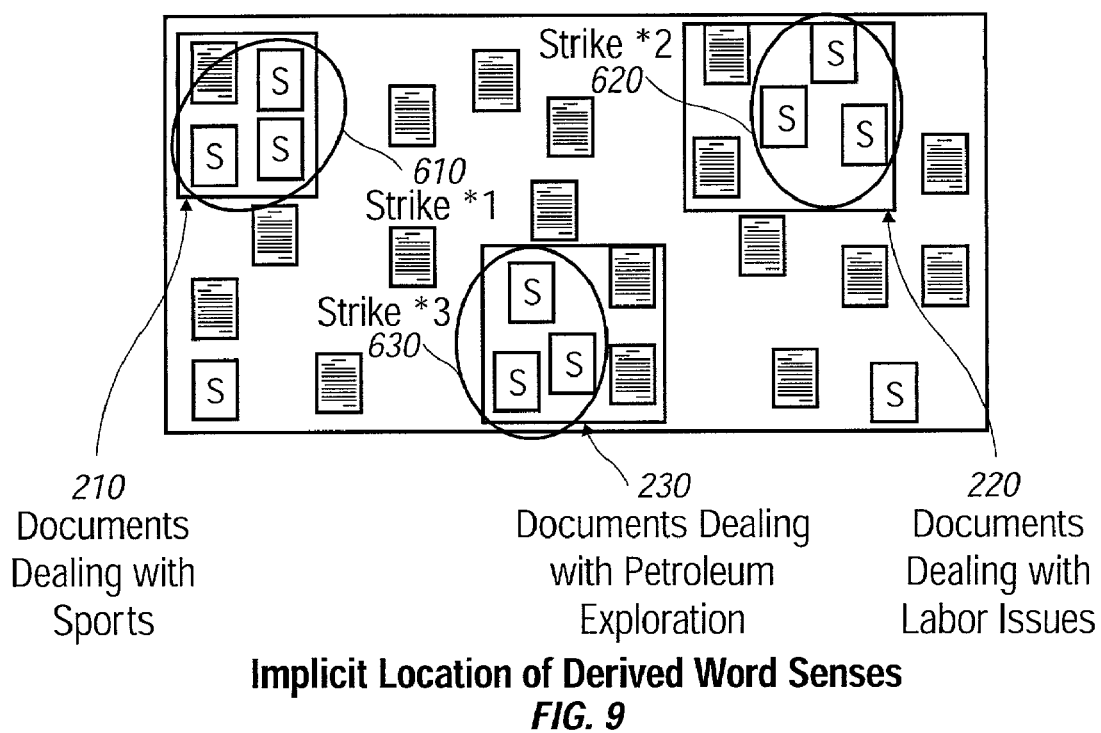
FIG. 9 illustrates a two-dimensional representation of an LSI space illustrating the implicit location of derived word senses according to one embodiment of the present invention.

For each cluster that is detected, we can associate an implicit position in the LSI space corresponding to the individual sense of the term of interest that dominates that cluster. This implicit position is simply the geometric average of the locations of the documents from the cluster that contain the term. The document location is used because there may be more than one occurrence of the given term in a particular document. Using the document locations keeps this operation consistent with the others that have taken place in creating the space. It is important to maintain the proper position of these disambiguated terms with respect to all the other terms. FIG. 9 shows the application of this process, arbitrarily labeling the senses of strike in the example as strike*1 610, strike*2 620, and strike*3 630. These implicit positions of the individual identified word senses can be used in several important ways, as demonstrated below.

In a given application, terms for which disambiguation is desired are treated in a similar fashion to that described in the example above. In general, it is not necessary to disambiguate all of the terms that occur in the documents of interest. For example, short words such as the, to, from, and as typically are not treated, unless of special interest. Similarly, terms that occur only once in a collection of documents often typically are not treated, for example, in many information retrieval applications.

From the clustering alone, we can discern/discriminate one or more senses of terms of interest. But discerning/discriminating provides no direct information regarding the actual meaning associated with each sense occurrence. That is, at this point in the process we have accomplished sense discrimination (or discernment) but have not yet achieved sense tagging. In some applications, it is sufficient to know that one or more senses exist.

For example, consider the case of an information retrieval system where users provide some feedback regarding documents of interest. An initial query consisting of the word strike would retrieve documents in all three of the clusters in the earlier example. Assuming that the user indicates an interest in a document associated with one of the clusters and/or no interest in documents associated with the other two clusters. This would be sufficient information to select (or highly rank) documents that contained the desired sense of strike.

Many applications, however, require knowledge of the specific meaning associated with each derived word sense or term occurrence. Two embodiments of the present technique allow meaning to be determined with accuracy greater than that achieved by existing methods described earlier in this disclosure. Each method can be applied to either a derived sense having an implicit position, or to a single term occurrence. For ease of explanation, the methods are described using derived word sense with an implicit position.

One approach is to process a subset of terms that are located near the sense for which the meaning is to be determined. In preferred embodiments of the present invention that use this approach to sense tagging, some information external to the LSI space is required. Such information could consist of a small collection of text in which word senses have been tagged with meaning, as described below. Another approach is to exploit a dictionary or thesaurus, matching the sense of a term with the closest meaning or the preponderant meaning of the terms near to the sense under consideration. If the documents near the implicit position of strike*1 contained numerous instances of words such as pitcher, mound, ballpark, etc., the meaning of strike*1 could be associated with that of a swing and a miss in baseball. Similarly, a preponderance of words such as union, grievance, walkout, etc., near strike*2 would identify this sense of the word as that associated with work stoppages.

An advantage of the present invention is that the context that is considered is much larger than in typical previous techniques. There is a high probability of topically unrelated terms occurring within the small windows used in prior techniques. In the present invention, a large number of terms are taken into account. The meaning to be assigned to the sense of interest is determined by the preponderance of these neighboring terms. The nature of the LSI space 110 is such that this preponderance will indicate the correct meaning an acceptable percentage of the time. The number of unrelated terms accidentally occurring close to the sense of interest is typically small in comparison to the set of preponderant terms. Thus, these "noise" terms can be effectively discriminated against.

Sets of terms whose co-location indicates specific meaning readily could be derived from sources such as machine-readable dictionaries, WordNet, and tagged corpora. The inherent rich context of the present invention makes the use of such resources more effective than in previous techniques. The invention inherently discriminates against noise in the form of terms that appear but are not strongly associated with the latent semantic structure, and thus with the proper senses for the terms used. Moreover, preferred embodiments of the present invention derive context from whole documents and even groups of documents, rather than the smaller windows of previous techniques. The presence of noise terms in the text and the absence of desired terms in the narrow windows employed have been substantial reasons why the use of such resources in the past has yielded poor results.

Another method of identifying specific meanings is based directly on tagged corpora. One or more corpora are subdivided into segments of reasonable size (e.g., paragraph size) and are directly indexed into the LSI space. Preferably, each corpus and the application documents are indexed at the same time. The SVD algorithm used is not incremental. New documents can be mapped into the LSI space later in a direct fashion, but their positioning in the space is slightly inaccurate. The different senses of each term from each corpora are appropriately represented so as to be indexed as different terms from the point of view of the LSI index. The implicit location of a word sense derived as described above then is compared to the actual locations of the known senses of the term in the LSI space. The derived sense is assigned the same meaning as the closest established sense (from the tagged corpora) in the space.

The closest established sense can be determined in several ways. Consider a sense to be disambiguated, it has a position in the space based on the documents in which it occurs. This position could be assigned the meaning corresponding to:

- the closest instance of the same term that has a tagged sense (from the corpora);
- the tag associated with the closest centroid of multiple instances of the same term that have the same sense, i.e., the implicit position of that sense of the term considering only the terms from the tagged corpora;
- the preponderant tag of the K-nearest instances of tagged instances of that term (this approach to classifying objects/terms is called K-means clustering;
- the tag for the closest term for which a tag is known—in case the term to be disambiguated itself does not appear in the tagged corpus;
- the preponderant tag of the K-nearest terms that have established tags (another application of K-means clustering).

In many cases, even a single example of the sense of interest in the tagged corpus is sufficient to allow such discrimination. Even in cases of fine distinctions, only a few instances are needed. In alternate embodiments of the present invention, the user is presented with a list of most likely meanings to choose from. Through exploiting the power of the vector space indexing technique, preferred embodiments of the present invention make better use of tagged corpora than previous techniques, which typically require tens of examples of each sense.

A combination of the above two techniques also could be used. This would improve both accuracy and coverage. The coverage of the tagged corpora generally will have some limitations. However, using the tagged corpora is the most accurate approach. A good tradeoff would be to use the tagged corpora to determine the proper tag for those terms that appear in the corpora and using the dictionary, or other auxiliary resource to tag the remaining terms.

A bootstrap technique could be applied to new terms that do not occur in the supporting resources. For example, the word bunting might not occur in the resources used. Application of the overall technique described above might yield a clustering of the term bunting in two regions of the space. Following the notation used above, the clusters are labeled as bunting*1 and bunting*2. As before, the senses have been discriminated, but not yet tagged with meaning. Next, the degree of overlap of the cluster regions of bunting*1 and bunting*2 with other cluster regions associated with terms whose sense had been tagged is calculated. The sense of each variant of bunting is then be assigned as comparable to the sense of the term with the greatest degree of cluster overlap. The cluster for the term bunting*1 might, for example, most closely overlap the cluster for the term strike*1 above. In that case, the sense of bunting*1 is identified as one associated with sports, or more specifically, with baseball. Continuing, the cluster associated with bunting*2 might most closely overlap that of the sense of the word decoration as related to parties, thus supplying an identification of that sense. It is important to note that the precision of labeling obtained in this manner is likely to be adequate for nearly all practical applications of word sense disambiguation.

The above approaches allow disambiguation of terms that occur infrequently and thus do not cluster strongly. In fact, a high-probability disambiguation can be carried out in this manner for terms that occur only once in a collection. This also applies to isolated instances of terms lying outside of the derived clusters, such as the two instances of the word strike in documents at the bottom of FIG. 9. Associating the sense of the nearest cluster in most cases will be correct.

Preferred embodiments of the present invention allow for tuning of the degree of sense separation that is achieved. There are several important parameters that can be set to control the process. Two of these are the dimensionality of the vector space and the threshold for clustering.

The number of dimensions to retain in the LSI space is a parameter that is set before the space is constructed. Dimensionality of the LSI space is typically selectable in existing LSI software. In general, the larger the dimensionality, the greater the degree of separation of concepts in the space. There is, however, a tradeoff of dimensionality versus generalization capability and noise immunity. One of the useful aspects of the LSI space is that terms that are similar in meaning lie close together in the space. The higher the dimensionality, the further apart similar terms will be, leaving more possibilities for overlapping with the positions of other, less-related terms.

The threshold for defining a cluster is also a parameter in most clustering algorithms. In the present invention, this parameter is set so as to achieve a desired degree of separation of senses for a given term. For example, the word strike used in the above examples has two dozen common meanings. For a given application, it may be sufficient to differentiate only the most widely used half dozen meanings. Other applications may require identifying the detailed sense of essentially every occurrence of the term.

One of the most interesting applications of the LSI technique has been in the area of cross-lingual text retrieval. This application is described in an article by Dumais and in U.S. Pat. No. 5,301,109. Dumais, S., et al, Automatic Cross-linguistic Information Retrieval using Latent Semantic Indexing, in SIGIR'96—Workshop on Cross-Linguistic Information Retrieval, pp. 16–23. Documents in multiple languages can be represented in a single LSI space. This fact opens up a number of interesting disambiguation possibilities. In a multilingual LSI space, the techniques of the present invention would allow disambiguation of the meaning of terms in one language based on clustering of documents and sense identifications in another language. In this manner, the utility of sense definition resources could be greatly extended. In addition, individual senses of a given term in one language often are represented by different terms in another language. The locations of these terms in the LSI space could be used in labeling the senses associated with the sense clusters developed for the given term during the disambiguation process of the present invention. This would require only the availability of a machine-readable bilingual dictionary. Such resources are becoming widely available for many language pairs. The more languages in the LSI space to which this process is applied, the more accurate the mutual disambiguation will be.

It should be noted that preferred embodiments of the present invention can differentiate among multiple meanings of terms over and above linguistic variations. For example, the technique can differentiate usage of the acronym ELF in the context of extremely low frequency communications and the same acronym being used in the sense of Eritrean Liberation Front. This extends to multiple contexts of a single name. For example, Eisenhower in the context of president can be separated from the same term, identifying the same person, but used in the sense of military commander. The extent to which such distinction is necessary or desirable will vary with the application.

Yet another advantage of the present invention is the high potential for automation of the process. The present invention relies on representation of objects of interest (terms and collections of terms) in a vector space. In preferred embodiments of the invention, construction of this representation is a highly automated process. The present invention requires no other information in order to carry out sense discrimination. In order to accomplish sense tagging, there is a need for a list of tags, together with some definitions that distinguish them. In the method of the present invention, such tags and definitions can be mapped into the same vector space from readily available existing resources in a highly automated manner, providing an automated ability for sense tagging as well.

In a preferred computer-implemented embodiment of the present invention, programming is used to forming an m by n matrix, where each matrix element (i, j) corresponds to the number of occurrences of term i in document j. After forming the matrix, the programming performs singular value decomposition and dimensionality reduction on the matrix to form a latent semantic indexed vector space. The programming then determines at least one cluster of documents within the vector space, each cluster corresponding to a subset of documents within the space that containing a subject term. The implicit position within the vector space of at least one sense of the subject term is determined as described above.

The nature of the present invention conveys an advantage in that it inherently requires little maintenance. Sense discrimination is maintenance-free and sense tagging requires minimal resource input. The population of the vector space is driven almost entirely by the terms that constitute the text passages of interest. Prior methods, requiring the construction of pre-defined structures involving terms or concepts, have a significant limitation in this regard. Both language and the structure of human discourse change at a much greater rate than are generally realized. New terms, such as Reaganomics, may enter the vocabulary of discourse relatively suddenly, enjoy a period of popularity, and then decline or disappear. New terminology may be generated en masse, such as the plethora of e-words generated in association with the concept of e-commerce.

In addition to vocabulary, new categories for organizing information constantly are being created, flourishing, and, often, subsequently declining. The topic of neural networks, for example, is of relatively recent origin. It provides a useful conceptual categorization for a collection of techniques and systems that have previously been associated with a diverse set of conceptual categories. Generation of new categories often is associated with generation of new vocabulary, in particular new senses for existing terms. Techniques for word sense disambiguation that rely upon pre-defined constructs of terms and/or categories are fundamentally unsuited for dealing with the changes described above. Nearly all previous techniques require such constructs.

One aspect of the present invention is that it can determine the probable existence of multiple senses for entirely new terms. This can be exploited in some applications, such as information retrieval, without having to explicitly determine the meanings associated with the new terms. The derived multiple senses for a new term may not be entirely accurate in a linguistic sense. For many applications, however, this is not problematical. In retrieval applications, for example, multiple senses may readily be collapsed based on user feedback. In general, this action will be transparent to the user. For applications requiring the tagging of word senses, the bootstrap method described above can be employed for dealing with new terms in an entirely automated fashion. This bootstrapping capability marks a major advance in the state of the art.

The present invention also derives advantage from the fact that it is completely independent of subject matter. Preferred embodiments of the invention are driven by the terms and text passages that are mapped into the vector space. The pre-specified structures used in prior techniques generally induce an element of domain specificity. Typically, when such techniques are applied in new domains their performance degrades significantly. In many technical domains, for example, terms are used as terms of art with meanings quite different from their meanings in ordinary discourse. Prior methods that employ pre-defined term/concept constructs typically perform poorly when dealing with such subject matter. The present invention, being driven entirely by the text of interest, inherently is resistant to such degradation. The sense discrimination approach employed is completely independent of subject matter. The bootstrapping method for assigning senses to new terms also is independent of subject matter.

While prior techniques for word sense disambiguation deal solely with standard terms used in general discourse, preferred embodiments of the present invention intrinsically deal with character strings. Thus, it can disambiguate senses for proper names, acronyms, compound terms, and even alphanumerical strings. For instance, as noted above, it discriminates between contexts where the acronym ELF stands for Eritrean Liberation Front and those in which it stands for extremely low frequency. This feature of preferred embodiments of the invention is an advantage of the present invention in business, government, and technical applications, where acronyms and specialized terminology are ubiquitous.

The fact that the LSI vector space representation is based on character strings means that the present invention is language-independent. In fact, as noted above, it can be used to disambiguate terms in multiple languages simultaneously. Prior techniques generally have been strongly language-dependent.

The present invention provides a natural approach to cross-lingual disambiguation. That is, terms in two or more languages can be disambiguated, and the associations among disambiguated terms in the languages can be established. This is done automatically, without requiring translation of any of the text passages from any of the languages. This unique capability is of particular importance in applying the present invention in the area of machine translation.

An additional advantage of the present invention is that it is controllable in terms of the degree to which disambiguation is carried out. This is true in two respects. First, the extent of separation of senses of individual terms can be controlled by specifying the number of clusters to be generated. Controlling the extent of separation is related to, but not necessarily the same as controlling the clustering threshold. In standard clustering algorithms, a user typically can set either a fixed number of clusters to generate from a given data set or a threshold that will produce a number of clusters based on the characteristics of the data. In the present invention, either approach can be taken. An analytically optimal approach has yet to be identified for determining the best choices of numbers of clusters or of thresholds. In general, the chosen parameter will be varied in tests and values that yield the best performance for a particular application will be chosen. This may be done for individual applications or for classes of applications. Additionally, this can be done on a term-by-term basis.

Second, the number of terms that are disambiguated can be controlled. In some applications, it is not necessary or even desirable, to draw very fine-grained distinctions among word senses. In many applications, it is not necessary to disambiguate every term. The present invention allows control over the extent to which disambiguation is applied to any term. For example, the n-most polysemous terms or the n-most frequently occurring non-stopwords can be designated for disambiguation.

An economic advantage of the present invention is that it exploits the LSI technique. This has two major consequences. First, by being based on the LSI technique, the present invention can take advantage of the millions of dollars that have been invested in the development of LSI software. Second, LSI is being used in a growing number of information processing applications. For any collection of documents, there are no differences in the LSI space created for other reasons, such as information retrieval, and the one employed in the present disambiguation technique. Thus, in applications where the LSI technique will be used for other purposes, the present technique can be implemented without requiring additional data structures.

The technique presented here does not require the term to be disambiguated to appear many times in either the documents of interest or in any supporting material used in defining senses. In fact, the technique is capable of determining the sense of a term that appears only once in either collection.

I claim:

1. In a collection of n documents and a reference collection, each document containing terms, the reference collection containing at least one meaning associated with a term, the total number of terms occurring at least once in the document collection equal to at least m, a computer-implemented method for determining a meaning for a sense of a subject term, the subject term found in at least one document and associated with at least one meaning, the computer-implemented method comprising:

forming an m by n matrix, where each matrix element (i, j) corresponds to the number of occurrences of term i in document j;

performing singular value decomposition and dimensionality reduction on the matrix to form a latent semantic indexed vector space;

determining at least one cluster of documents within the vector space, each cluster corresponding to a subset of the document collection, each member of the subset having at least one occurrence of a subject term;

discerning an implicit position of a sense of the subject term, each implicit position corresponding to at least one determined cluster;

discerning at least one non-subject term within the vicinity of the implicit position of the sense; and assigning to the sense having a discerned implicit position, the meaning, associated with the term in the reference collection, that correlates best with the discerned non-subject terms closest to the implicit position of the sense.

2. In a collection of n source documents and a collection x reference documents, each document containing terms, each reference document containing at least one meaning associated with a term, the total number of terms occurring at least once in the combination collections equal to at least m, a computer-implemented method for determining a meaning for a sense of a subject term, the subject term found in at least one source document and associated with at least one meaning, the computer-implemented method comprising:

forming an m by [n+] matrix, where each matrix element (i,j) corresponds to the number of occurrences of term i in document j;

performing singular value decomposition and dimensionality reduction on the matrix to form a latent semantic indexed vector space;

determining at least one cluster of documents within the vector space, each cluster corresponding to a subset of the [n+x] documents having at least one occurrence of a subject term;

discerning the implicit position of at least one of the subject term corresponding to at least one determined cluster; and assigning to at least one sense corresponding to at least one discerned implicit position, the meaning of the subject term closest within the vector space to the implicit position of the sense.

3. The method described in claim 2 wherein each document in the reference source corresponds to one meaning.

4. In a collection of documents, each document containing a plurality of terms, a computer program product for discerning the presence of at least one sense of a subject term when executed on a computer system, the computer program product comprising:

a computer-readable medium;

a matrix-forming module stored on the medium, the matrix-forming module operative to form an m by n matrix, where each matrix element (i, j) corresponds to the number of occurrences of term i in document j;

a singular value decomposition and dimensionality reduction module stored on the medium and coupled to the matrix forming module, the singular value decomposition and dimensionality reduction module operative to form a latent semantic indexed vector space from the matrix;

a clustering module stored on the medium, the clustering module operative to determine at least one cluster of documents within the vector space, each cluster corresponding to a subset of documents within the vector space containing a subject term; and a sense position determining module stored on the medium, the sense position module operative to determine an implicit position within the vector space of at least one sense of the subject term, the implicit position corresponding to at least one determined cluster.

\* \* \* \* \*